United States Patent Office 3,342,732
Patented Sept. 19, 1967

3,342,732
PROCESS FOR FLOCCULATING AQUEOUS DISPERSIONS OF SOLIDS USING ELECTROPOSITIVE POLYSACCHARIDE COMPLEX
Donald C. Goetz, Minneapolis, Minn., assignor to Ashland Oil & Refining Company, Ashland, Ky., a corporation of Kentucky
No Drawing. Filed July 30, 1964, Ser. No. 386,372
6 Claims. (Cl. 210—54)

The present invention relates to electropositive polysaccharide complex. In one aspect, the present invention relates to a method for forming electropositive polysaccharide complex and to the products, per se. In another aspect, the present invention relates to electropositive polysaccharide complex prepared by treating electronegative biochemically synthesized polysaccharide with aluminum sulfate. These electro positive polysaccharides are effective flocculants and will find use in areas of paper manufacture, water clarification and the like.

Considerable interest in polysaccharides produced by the bacterial fermentation of carbohydrates has been exhibited in recent years. Impetus has been given to the commercial development of these polysaccharides by the discovery that certain biochemically synthesized polysaccharides have properties which permit their use as thickening agents for water. The tremendous thickening property of these particular polysaccharides has resulted in such suggested uses as foam enhancers for beer, as emulsion stabilizers for mayonnaise and the like, and as water thickening agents for use in secondary recovery operations carried out in the petroleum industry. By way of example, it has been found that these biochemically synthesized polysaccharide materials may be added to water or brine in suitable concentrations to produce viscous solutions which are relatively stable under the conditions that prevail in subsurface oil reservoirs. By utilizing these viscous solutions in place of the water or brine normally employed in water flooding projects, a very favorable mobility ratio between the oil in the reservoir and the liquid used to displace it can be obtained. Thus, secondary recovery operations can be enhanced.

Ordinarily, these biochemically synthesized polysaccharides, frequently referred to as gums, are electronegative (i.e. anionic) in their native state. It has now been discovered, and this discovery forms a basis for the present inventions, that these gums can be made electropositive (i.e. cationic) by simply treating a conventionally produced gum with aluminum sulfate. The resulting electropositive polysaccharide complex has been demonstrated to be an effective flocculant for kaolin clay.

The present discovery seems quite unique, especially in view of other developments. Earlier, it has been discovered by the present inventor, that polysaccharide-thickened water could be gelled by the addition thereto of a tri-valent metal salt such as ferric sulfate, with or without the addition of a metallic promoter such as zinc. For example, ferric sulfate, alone, could be added to Xanthomonas gum-thickened water to form a gel almost immediately. In a like manner, aluminum sulfate, with the aid of finely divided zinc, could be added to Xanthomonas gum-thickened water to form a gel. However, repetitive experimentation has shown aluminum sulfate to be unique among the tri-valent metal salts tested thus far in that it, alone, appears to form a usable complex with Xanthomonas gum. When added to aqueous solutions of Xanthomonas gum, aluminum sulfate seems to form a complex almost immediately. As an apparent consequence, the subsequent rate of gel formation is so slow as to be of limited practical significance. However, the addition of a metallic promoter such as finely divided zinc causes a gel to form rapidly, e.g. in 1–2 minutes.

In practicing the present invention, Xanthomonas gum and aluminum sulfate are mixed, preferably in an aqueous medium. Alternatively, the gum and aluminum sulfate may be mixed, dry, and then added to water. In any event, a complex forms between the gum and aluminum sulfate when they are dispersed in water in the presence of each other. Dilute aqueous solutions of the resulting electropositive complex are stable for periods in excess of several days. Quite obviously, non-gelling conditions should be employed while practicing the present invention. Thus, significant amounts of materials that promote gel formation such as finely divided zinc and nickel must be excluded from aqueous solutions of the electropositive polysaccharide complex. A preferred technique for forming the electropositive polysaccharide complex is to add an aqueous solution of aluminum sulfate to an aqueous dispersion of Xanthomonas gum. The complex may be recovered from solution by spray drying and the like. The solid thus recovered can be re-dispersed in water at a later time.

The electronegative polysaccharides useful in the present invention are those produced from carbohydrates by the action of bacteria of the genus Xanthomonas. Various methods for the biochemical production of polysaccharides with Xanthomonas organisms are known. See for example, U.S. Patent Nos. 3,020,206 and 3,020,207. Broadly described, these bichemical processes for synthesizing polysaccharides involve the initial preparation of a broth containing a carbohydrate nutrient, e.g. a cereal grain flour, preferably in a finely ground form. The nutrient is heat sterilized to kill extraneous bacteria which produce unwanted products. The broth, ordinarily containing about 100 parts by weight of water, will usually contain from 1 to 5 parts by weight of suitable carbohydrate nutrient, organic nitrogen sources, and appropriate trace elements. This broth is then inoculated with bacteria of the genus Xanthomonas (e.g. *Xanthomonas campestris*) and fermented under aerobic conditions. pH control (usually from 5–8.5, e.g. from 6.5–7.2) is necessary to achieve optimum yields. Fermentation is allowed to proceed until the culture viscosity has reached a desired level, usually between 3,000 and 12,000 centipoises. At this point, the desired gum may be recovered by any suitable procedure. Spray drying is one effective recovery technique that has been used. After drying, the gum will usually be a slightly colored, light, fluffy powder. Although the present invention is not known to be dependent in any significant way upon the detailed manner of preparation of these polysaccharides, it should be kept in mind that variations in the manner of preparation, and in the recovery techniques employed, will result in the production of gum products which differ slightly from each other. Consequently, while all known methods for producing these types of polysaccharides with bacteria of the genus Xanthomonas may be used to produce a gum which can be made electropositive by practicing the present invention, it will be appreciated that certain minor variations will exist depending upon the particular method of preparation that is selected. Excellent results have been obtained by using the preferred gums which are produced by bacteria of the species *Xanthomonas campestris*. Still more preferred are those gums derived from cereal grain flour, especially sorghum grain flour.

As previously indicated, the electropositive polysaccharide complex is prepared by mixing aluminum sulfate and electronegative polysaccharide under aqueous conditions. The amount of electronegative polysaccharide used will be a water thickening amount of from 0.02 to 3 or more weight percent based on the weight of water present. However, it is preferred to operate with gum (i.e. electronegative polysaccharide) concentrations of from 0.04 to 0.75 weight percent due to the excessive viscosities encountered at higher gum concentrations. Especially preferred are gum concentrations of from 0.07 to 0.30 weight percent. When the electropositive polysaccharide complex of the present invention is prepared from electronegative gum at these concentrations, the resulting solution of electropositive polysaccharide complex can be used as a flocculant without further processing.

Aluminum sulfate may be used in any of its usual forms, i.e. anhydrous or hydrated. The amount of aluminum sulfate that can be used (calculated as $$Al_2(SO_4)_3 \cdot 18H_2O$$

is from 10 to 1,000 or more weight percent e.g. 30 to 500 weight percent based on the weight of electronegative gum present. When the electropositive polysaccharide complex is to be used as a flocculant, the electropositive polysaccharides formed with a small amount of aluminum sulfate (e.g. 50 weight percent) produce small flocs, while those produced with larger amounts of aluminum sulfate (e.g. 400 weight percent) produce very large flocs. The latter are desirable in water clarification while the former are useful in paper manufacture.

The present invention will be more clearly understood by reference to the following specific examples which include a preferred embodiment. Unless otherwise indicated all parts are by weight and all percentages are by weight.

EXAMPLES 1–10

The technique used in preparing Examples 1 to 10 was as follows: a 0.1 weight percent electronegative gum disperson was prepared at room temperature by simply mixing 0.6 gram of electronegative gum (produced from sorghum grain flour by bacteria of the species *Xanthomonas campestris*) in 600 ml. water. To 100 ml. portions of this dispersion were added, at room temperature, varying amounts of a 10 weight percent $Al_2(SO_4)_3 \cdot 18H_2O$ solution ranging from 0.25 ml. (25% based on gum weight) to 4 ml. (400%, based on gum weight). All solutions thus prepared were tested by immersing electrodes from a 15 volt battery in them and observing particle migration. The control sample (no aluminum sulfate) migrated to the positive electrode while all examples containing aluminum sulfate migrated to the negative electrode. This clearly demonstrates the transition of the gum from electronegative to electropositive.

The solutions containing the electropositive polysaccharides were then tested as flocculants by adding various amounts of each solution to filled 100 ml. graduates containing 0.1 weight percent aqueous slurries of a kaolin clay of the type used in paper manufacture. The graduates were inverted several times to mix the clay and electropositive polysaccharide complex. Then, settling was observed over a 2.5 minute time period. The results of those tests are shown in Table I.

TABLE I. ELECTROPOSITIVE POLYSACCHARIDES AS FLOCCULANTS

| Example | Ml. 0.1% electronegative gum used | Aluminum sulfate, wt. percent on gum | Observations on 100 ml. of 0.1% Clay Slurries | | | | | |
|---|---|---|---|---|---|---|---|---|
| | | | Immediate | 30 seconds | 60 seconds | 90 seconds | 120 seconds | 150 seconds |
| Control sample | 3 | 0 | No floc | No floc | No floc | No floc | No floc | No floc |
| 1 | 3 | 50 | No floc | Very fine floc | Larger floc, settling starts | Rapid settling | Rapid settling | 5 ml. solids |
| 2 | 3 | 100 | Flocs form | Rapid settling | Very Rapid settling | 5 ml. solids | Still settling | Still settling |
| 3 | 3 | 200 | Large flocs | Rapid settling | 5 ml. solids | Still settling | Still settling | Still settling |
| 4 | 3 | 400 | Very large stringy flocs | Rapid settling | Solids very compact, so 5 ml. solids never reached | | | |
| 5 | 1 | 100 | Fine flocs | Settling | Rapid settling | Still settling | Still settling | Still settling |
| 6 | 3 | 100 | Flocs form | Rapid settling | Very rapid settling | 5 ml. solids | Still settling | Still settling |
| 7 | 6 | 100 | Large flocs | Rapid settling | 5 ml. solids | Rapid settling | Still settling | Still settling |
| 8 | 1 | 400 | Stringy flocs | Settling | Rapid settling | Rapid settling | Rapid settling | Rapid settling |
| 9 | 3 | 400 | Very large stringy floc | Rapid settling | Rapid settling | Too compact to get 5 ml. solids | | |
| 10 | 6 | 400 | Very large floc | 5 ml. solids | Rapid settling | Still settling | Still settling | Still settling |

From Table I it can be seen that the electropositive polysaccharides are effective flocculants while the electronegative polysaccharide (i.e. the control sample) was ineffective. When used as a flocculant, the amount of electropositive polysaccharide complex ordinarily required is very small. Generally from 0.0005 to 0.06 gram, usually about 0.001 to 0.006 gram (calculated on the basis of the weight of the electronegative polysaccharide present in the complex) will be used for each 100 ml. of aqueous material to be flocculated. By way of illustration, see Example 6 which used about 0.003 gram of gum in 100 ml. of clay solution.

The foregoing description and examples illustrate how electropositive polysaccharide complex can be prepared. Further, the data show that the electropositive polysaccharides are effective flocculants, especially for kaolin clay.

What is claimed is:

1. In a process for flocculating aqueous dispersions of solids wherein a flocculant is added to said disperson to flocculate said solids, the improvement which comprises using, as flocculant, electropositive polysaccharide complex of a polysaccharide gum, produced by the action of bacteria of the genus Xanthomonas on a carbohydrate, and aluminum sulfate.

2. Improved process as defined in claim 1 wherein said complex contains 30 to 500 weight percent aluminum sulfate based on the weight of Xanthomonas gum.

3. Improved process as defined in claim 2 wherein the amount of Xanthomonas gum used is from about 0.001 to 0.006 gram per 100 ml. of dispersion.

4. Improved process as defined in claim 3 wherein said solids comprise kaolin clay.

5. Improved process as defined in claim 1 wherein the gum is synthesized with bacteria of the species *Xanthomonas campestris*.

6. Improved process of claim 5 wherein the carbohydrate is sorghum grain flour.

References Cited

UNITED STATES PATENTS

| | | | |
|---|---|---|---|
| 303,930 | 8/1884 | Grimm | 127—65 |
| 3,096,293 | 7/1963 | Jeanes et al. | 195—31 X |
| 3,243,000 | 3/1966 | Patton et al. | 252—8.5 X |

MORRIS O. WOLK, *Primary Examiner.*

MICHAEL E. ROGERS, *Examiner.*